United States Patent
Arakawa

(10) Patent No.: US 12,467,504 B2
(45) Date of Patent: Nov. 11, 2025

(54) SEALING DEVICE

(71) Applicant: UCHIYAMA MANUFACTURING CORP., Okayama (JP)

(72) Inventor: Shiori Arakawa, Okayama (JP)

(73) Assignee: UCHIYAMA MANUFACTURING CORP., Okayama (JP)

(*) Notice: Subject to any disclaimer, the term of this patent is extended or adjusted under 35 U.S.C. 154(b) by 48 days.

(21) Appl. No.: 18/620,050

(22) Filed: Mar. 28, 2024

(65) Prior Publication Data

US 2024/0328460 A1    Oct. 3, 2024

(30) Foreign Application Priority Data

Mar. 29, 2023   (JP) ................... 2023-052951

(51) Int. Cl.
*F16C 33/80* (2006.01)
*B60B 27/00* (2006.01)
*F16C 33/78* (2006.01)

(52) U.S. Cl.
CPC ........ *F16C 33/805* (2013.01); *B60B 27/0073* (2013.01); *F16C 33/7883* (2013.01); *F16C 2326/02* (2013.01)

(58) Field of Classification Search
CPC .... F16C 33/7883; F16C 33/80; F16C 33/805; F16C 2326/02; B60B 27/0073
See application file for complete search history.

(56) References Cited

U.S. PATENT DOCUMENTS

2024/0019029 A1* 1/2024 Ohmori ................ F16J 15/3264
2024/0052888 A1* 2/2024 Duch ..................... F16C 19/06

FOREIGN PATENT DOCUMENTS

| DE | 102016219602 A1 * | 4/2018 | ............. F16J 15/002 |
| DE | 102017110115 A1 | 11/2018 | |
| WO | WO-2024179029 A1 * | 9/2024 | ........... F16J 15/3232 |
| WO | WO-2025036519 A1 * | 2/2025 | ............ F16C 33/586 |

* cited by examiner

*Primary Examiner* — Alan B Waits
(74) *Attorney, Agent, or Firm* — MUNCY, GEISSLER, OLDS & LOWE, P.C.

(57) ABSTRACT

A sealing device including a first member having a first cylindrical portion, of which end portion on an open side faces an outer side in a sealed space, and a second member having a second cylindrical portion, a disk portion, and an intermediate cylindrical portion. An end portion of the intermediate cylinder portion on an open side faces inner side in the sealed space. A communication path in a repeatedly bent shape communicating with the outer side is formed between the first cylindrical portion and the intermediate cylindrical portion when the sealing device is mounted in the sealed space. One of facing surfaces across the communication path is like a staircase in which steps are continuously provided to slope downward to the end portion of the intermediate cylindrical portion on an open side, and the other surface includes a plurality of protruding portions protruding to approach the one surface.

8 Claims, 6 Drawing Sheets

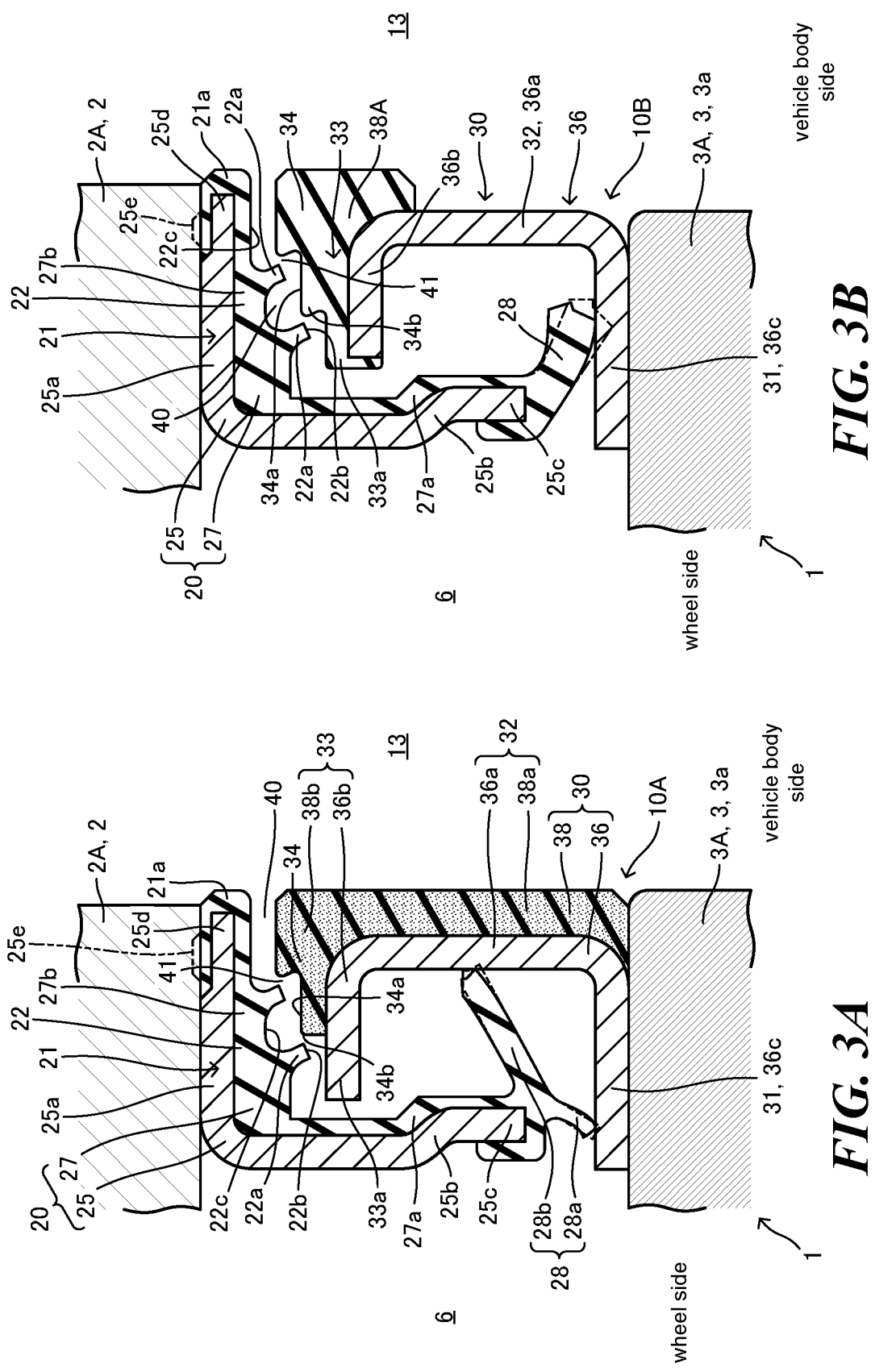

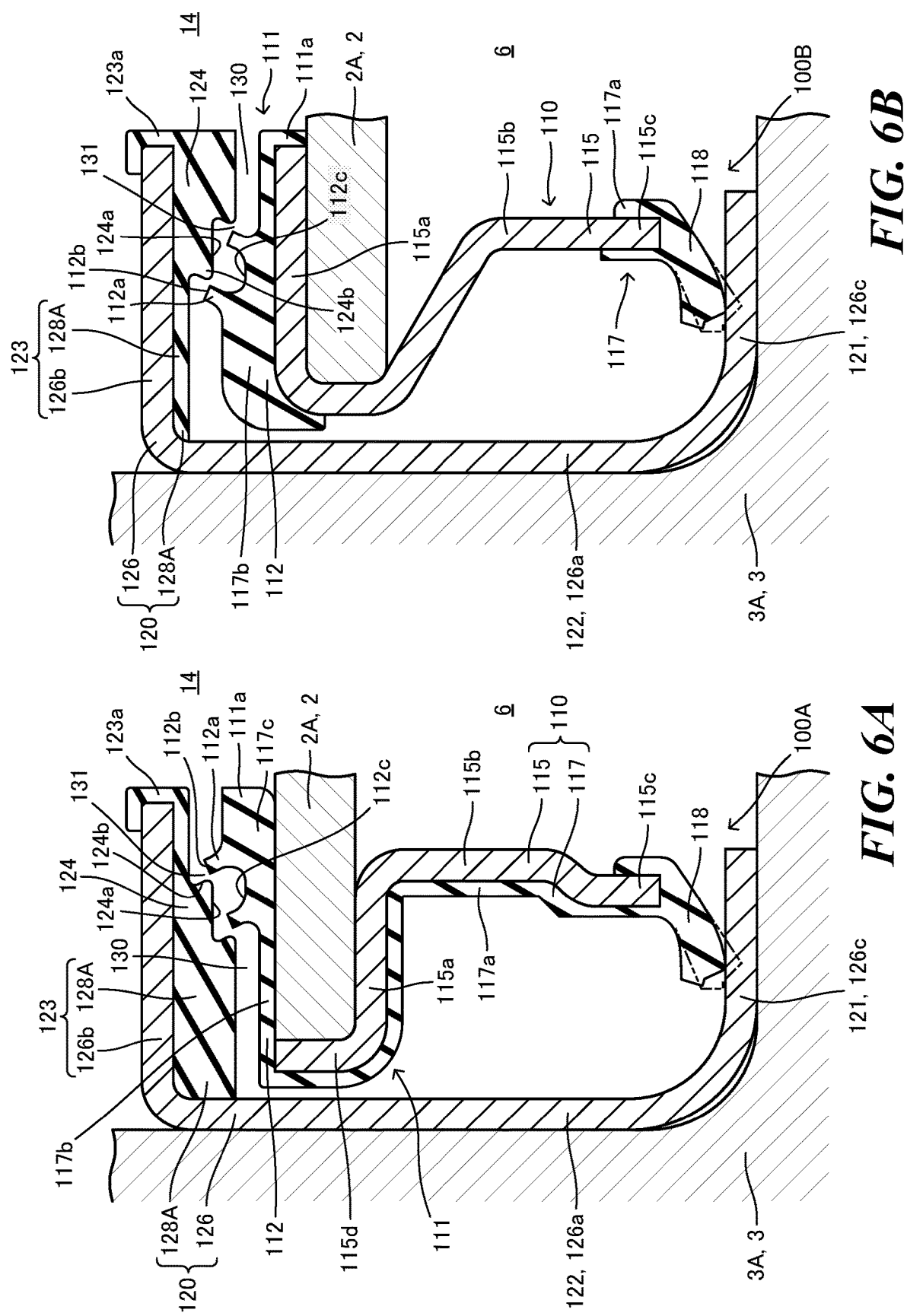

SEALING DEVICE

BACKGROUND OF THE INVENTION

Field of the Invention

The present invention relates to improvement in a sealing device that includes a first member and a second member and is installed in a sealed space to seal the sealed space between a fixed member and a rotary member of a bearing device.

Description of the Related Art

Various conventional sealing devices of this type having structures for suppressing muddy water from entering the sealed space have been proposed. In Patent Document 1, the facing surfaces of the cylindrical portions of the first member and the second member have an uneven shape so as to be able to be engaged with each other. When the two members are assembled between the fixed member and the rotary member, a zigzag-shaped gap with a small width in dimension is formed. Since the gap has such a shape, muddy water is suppressed from entering the sealed space.

RELATED ART DOCUMENTS

Patent Document

Patent Document 1: DE102017110115A1

SUMMARY OF THE INVENTION

Problem to be Solved by the Invention

The present invention is proposed to improve the above-mentioned Patent Document, and has an object to provide a sealing device that is excellent in assembling ability and molding ability and is capable of reducing the amount of muddy water that enters the sealed space from the outside.

Means of Solving the Problems

In order to achieve the above-mentioned object, a sealing device includes a first member and a second member, one of the first member and the second member is fitted to a fixed member of a bearing device, the other of the first member and the second member is fitted to a rotary member of the bearing device, and the sealing device is provided in a sealed space between the fixed member and the rotary member of the bearing device is provided. The first member includes a first cylindrical portion to be fitted to the bearing device, and an end portion of the first cylindrical portion on an open side is arranged so as to face an outer side in the sealed space. The second member includes a second cylindrical portion to be fitted to the bearing device, a disk portion continuously provided at the second cylindrical portion, and an intermediate cylindrical portion continuously provided at the disk portion; and an end portion of the intermediate cylinder portion on an open side is arranged so as to face an inner side in the sealed space. A communication path in a repeatedly bent shape communicating with the outer side is formed between the first cylindrical portion and the intermediate cylindrical portion when the sealing device is mounted in the sealed space. One of surfaces facing each other across the communication path is in a shape of a staircase in which steps are continuously provided so as to slope downward to the end portion of the intermediate cylindrical portion on an open side, and the other surface includes a plurality of protruding portions protruding so as to approach the one of surfaces.

Effects of the Invention

Having the above-described configuration, the sealing device of the embodiments of the present invention is excellent in assembling ability and molding ability and reduces the amount of muddy water that enters the sealed space from the outside.

BRIEF DESCRIPTION OF THE DRAWINGS

FIG. 3A and FIG. 3B are longitudinal sectional views showing two other examples of the sealing device.

FIG. 6A and FIG. 6B are longitudinal cross-sectional views of a sealing device according to a reference example of the present invention.

DESCRIPTION OF THE EMBODIMENTS

Embodiments of the present invention are described below with reference to FIG. 1 to FIG. 5 of the accompanying drawings.

Figure 1:
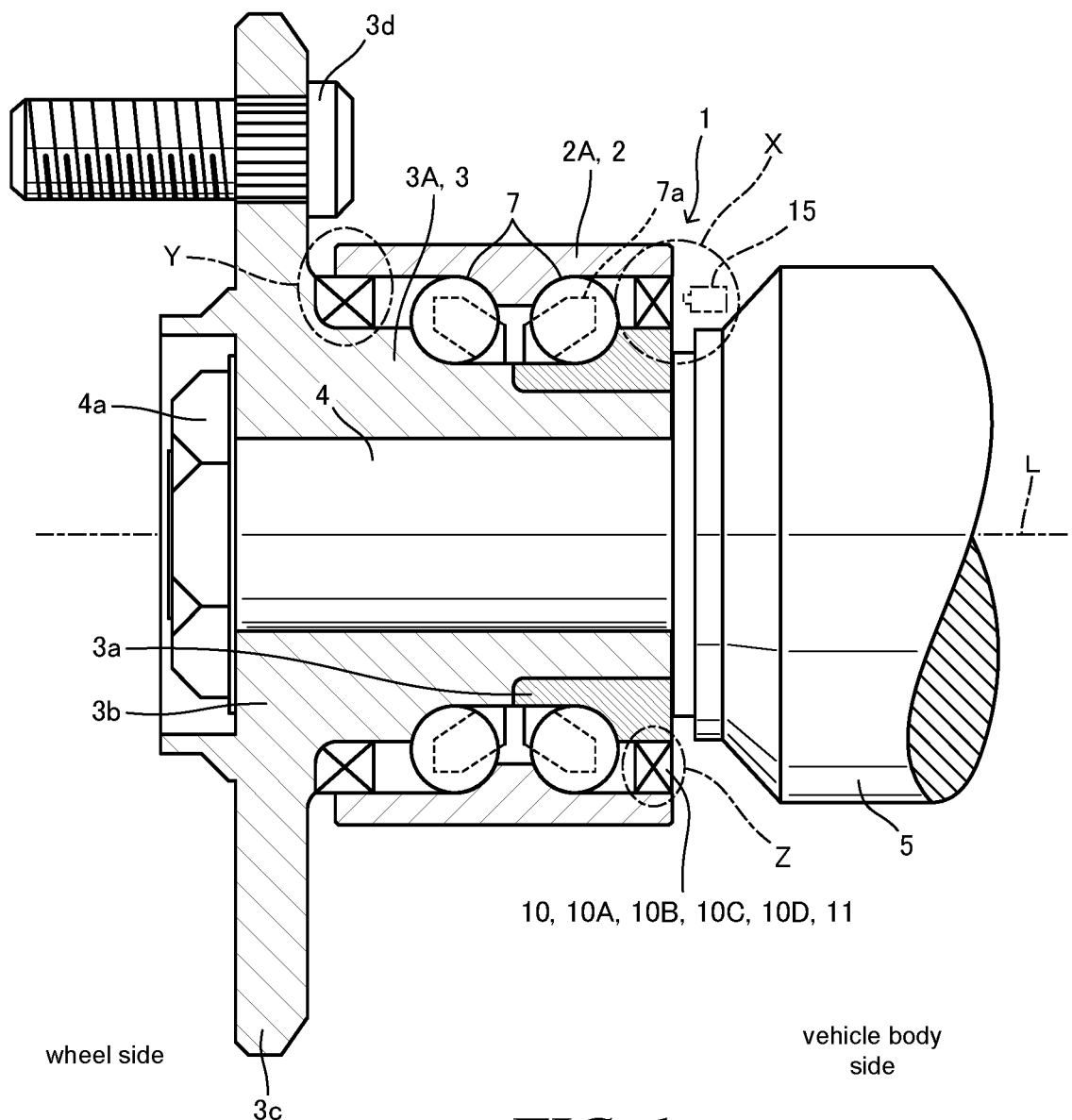
FIG. 1 is a longitudinal sectional view of a bearing device equipped with a sealing device according to an embodiment of the present invention.

First, based on FIG. 1, the schematic structure of a bearing device 1 to which a sealing device 10 is mounted is described.

In this specification, as shown in FIG. 1, the side facing the wheel, not shown, along the rotation axis L direction, namely the side facing the left side in FIG. 1, is referred to as the wheel side, and the side facing the vehicle body, not shown, namely the side facing the right side, is referred to as the vehicle body side.

In the bearing device 1 of FIG. 1, a hub ring 3b and an inner ring 3a are rotatably and axially supported via two rows of rolling elements 7 which are arranged inside an outer ring member 2 to be fixed to a vehicle body, not shown. The hub ring 3b has a hub flange 3c; and a drive ring, not shown, is attached to the hub flange 3c with a bolt 3d.

Further, a drive shaft 4 is coaxially spline-fitted to the hub ring 3b, and the drive shaft 4 is connected to a drive source, not shown, via a constant velocity joint 5. The drive shaft 4 is integrated with the hub ring 3b by a nut 4a, and the hub ring 3b is prevented from coming off the drive shaft 4.

The inner ring member 3 is constituted by the hub ring 3b and the inner ring 3a. The inner ring member 3 is capable of relatively rotating around the rotation axis L relative to the outer ring member 2. The rolling element 7 is interposed between the inner ring member 3 and the outer ring member 2 while being held by a retainer 7a. In this way, the outer ring member 2 and the inner ring member 3 constitute two members that rotate relatively, and an annular space including the intervening portion of the rolling element 7 is formed between the two members. This annular space is a bearing space and is defined as a sealed space 6.

Sealing devices 10, 10A, 10B, 10C, 10D, 11 are respectively attached to the end portion of the sealed space 6 on the vehicle body side in the rotation axis L direction, referring to the part X in FIG. 1. Further, another sealing device is attached to the end portion of the sealed space 6 on the wheel side, referring to the part Y in FIG. 1. By attaching the sealing devices 10, 10A, 10B, 10C, 10D, 11 to the both end portions, the both end portions of the sealed space 6 along the direction of the rotation axis L are sealed.

The sealed space 6 is filled with a lubricant, not shown, such as grease, thereby allowing the rolling elements 7 to roll smoothly. The sealing devices 10, 10A, 10B, 10C, 10D, 11 function to prevent the lubricant from leaking to the outside, prevent muddy water and dust from entering the sealed space 6 from the outside, and discharge the entered muddy water and the like.

Furthermore, an annular magnetic encoder, i.e., an annular magnet 38, referring to FIG. 2, to be described later, can be disposed on the vehicle body side surfaces of the sealing devices 10, 10A, 10B, 10C, 10D, 11 that are to be attached to the vehicle body side. A magnetic sensor 15 is installed on the vehicle body at a position facing the annular magnet 38.

The annular magnet 38 is an elastic member formed by kneading magnetic powder into a rubber material, integrally formed with slingers 36, 36A, to be described later and magnetized by alternately providing a plurality of N-poles and S-poles along the circumferential direction. The magnetic sensor 15 detects magnetic changes accompanied with the rotation of the annular magnet 38. That is, the magnetic sensor 15 and the annular magnet 38 constitute a rotation detection mechanism for the wheel, i.e. the inner ring member 3, and constitute an anti-lock braking system.

Next, the common basic configuration of the sealing devices 10, 10A, 10B, 10C, 10D, 11 shown in FIG. 2 to FIG. 5 is described.

The sealing devices 10, 10A, 10B, 10C, 10D, 11 include a first member 20 and a second member 30 and are installed in the sealed space 6 between the fixed member 2A and a rotary member 3A to seal the sealed space 6 so as to fit one of the first member 20 and the second member 30 to the fixed member 2A of the bearing device 1 and to fit the other of the first member 20 and the second member 30 to the rotary member 3A of the bearing device 1.

The first member 20 includes a first cylindrical portion 21 to be fitted and attached to the bearing device 1, and is arranged in the sealed space 6 such that an end portion on the open side 21a of the first cylindrical portion 21 faces the outside 13. The second member 30 includes a second cylindrical portion 31 to be fitted and attached to the bearing device 1, a disk portion 32 continuously provided at the second cylindrical portion 31, and an intermediate cylindrical portion 33 continuously provided at the disk portion 32. In the sealed space 6, an end portion on the open side 33a of the intermediate cylindrical portion 33 faces the inward of the sealed space 6.

When the sealing devices 10, 10A, 10B, 10C, 10D, 11 are installed in the sealed space 6, there is a repeatedly bent communication path 40 that communicates with the outside 13 between the first cylindrical portion 21 and the intermediate cylindrical portion 33. One of the surfaces facing each other across the communication path 40 is in the shape of a downward staircase of steps 34a continuing toward the end portion on the open side 33a, and the other surface has a plurality of protruding portions 22a protruding so as to be close to the one of the surfaces.

Here, the fixed member 2A is constituted by one of the outer ring member 2 and the inner ring member 3 of the bearing device 1, and the rotary member 3A is constituted by the other of the outer ring member 2 and the inner ring member 3 of the bearing device 1. The bearing device 1 shown in FIG. 2 to FIG. 4 is an example in which the outer ring member 2 is the fixed member 2A and the inner ring member 3 is the rotary member 3A. Further, the bearing device 1 shown in FIG. 5 is an example in which the outer ring member 2 is the rotary member 3A and the inner ring member 3 is the fixed member 2A. In either case, the outer ring member 2 and the inner ring member 3 are configured to relatively rotate each other.

In the embodiment described below, the first member 20 is a fixed side member, i.e. a member attached to the fixed member 2A, and the second member 30 is a rotary side member, i.e., a member attached to the rotary member 3A. However, in the present invention, it is also acceptable that the first member 20 is the rotary side member and the second member 30 is the fixed side member.

Figure 2:
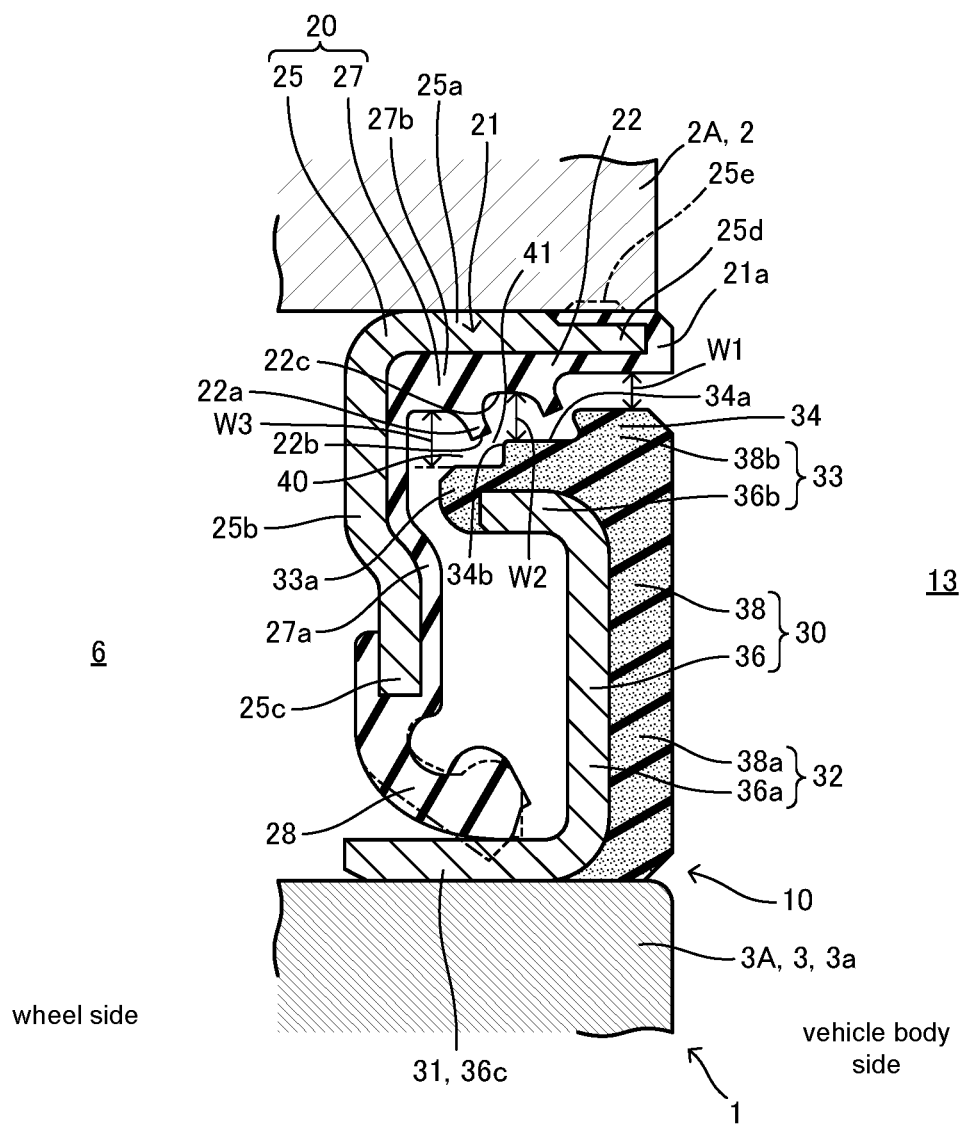
FIG. 2 is a longitudinal sectional view of the sealing device.

Each of the sealing devices 10, 10A, 10B, 10C, 10D shown in FIG. 2 to FIG. 4 is constituted by combining the first member 20 having a cylindrical body to be fitted into the outer ring member 2, i.e., the fixed member 2A, and the second member 30 having a cylindrical body to be fitted onto the inner ring member 3, i.e., the rotary member 3A.

The sealing device 11 shown in FIG. 5 is constituted by combining the second member 30 having the cylindrical body to be fitted into the outer ring member 2, i.e., the rotary member 3A, and the first member 20 having the cylindrical body to be fitted onto the inner ring member 3, i.e., the fixed member 2A.

As described above, in the examples shown in FIG. 2 to FIG. 5, the first member 20 is assembled to the fixed member 2A, i.e., the outer ring member 2 or the inner ring member 3, and the second member 30 is assembled to the rotary member 3A, i.e., the inner ring member 3 or the outer ring member 2. In this embodiment, when the outer ring member 2 and the inner ring member 3 rotate relative to each other in such a state, the first member 20 and the second member 30 rotate relative to each other while slidably contacting each other via a lip portion 28, to be described later, of the first member 20. The lip portion 28 can be of a non-contact type.

Next, the sealing device 10 shown in FIG. 2 is explained in detail.

The first member 20 includes a core member 23 to be fitted into the outer ring member 2 and a seal portion 27 made of an elastic member fixed to the core member 25. More specifically, the core member 25 includes a core member cylindrical portion 25a to be fitted into the inner peripheral surface of the outer ring member 2, and a core member disk portion 25b extending inward from an end portion of the core member cylindrical portion 25a on the back side of the sealed space 6, the core member 25 having an L-shaped cross section.

The seal portion 27 is made of an elastic material such as a rubber material or a synthetic resin material, and includes a seal base portion 27a fixedly integrated with the core member 25 by vulcanization molding, and a lip portion 28, i.e., a radial lip, extending from the seal base portion 27a. In FIG. 2, the two-dot chain line of the lip portion 28 indicates the original shape before elastic deformation, also referring to FIG. 3 to FIG. 5.

The seal base portion 27a is fixedly integrated with the core member 25 so as to wrap around an inner peripheral edge portion 25c from the middle of the core member disk portion 25b on the back side of the sealed space 6, cover the entire surface of the opposite side, further cover the entire of the inner peripheral surface of the core member cylindrical portion 25a, wrap around an end portion 25d on the vehicle body side, and to reach the outer peripheral surface of the core member cylindrical portion 25a.

As described above, the core member 25 and the seal portion 27 are integrated and constitute the first member 20 to be fitted to the inside of the outer ring member 2. The first cylindrical portion 21 is constituted by the core member cylindrical portion 25a and a seal cylindrical portion 27b, i.e., a facing surface 22 to be described later, that is a part of the seal base portion 27a. The two-dot chain line of the reference numeral 25e is the original shape of a protruding portion in order that the first cylindrical portion 21 contacts under pressure with the inside of the outer ring member 2, also referring to FIG. 3 to FIG. 5.

The entire first member 20 has an approximately L-shape like the core member 25, and the end portion on the open side 21a of the first cylindrical portion 21, which is one piece of the L-shape, is disposed on the outside 13. Further, the surface of the seal cylindrical portion 27b is formed to be uneven or in a concave and convex shape. The form of the surface of the first cylindrical portion 21, i.e., the seal cylindrical portion 27b, is described in detail together with that of the intermediate cylindrical portion 33 that faces the first cylindrical portion 21 with a gap space therebetween.

The second member 30 includes a double cylindrical slinger 36 to be fitted onto the inner ring member 3, and has a horizontally inverted U-shaped cross section and an annular magnet 38 fixed to the slinger 36.

The slinger 36 includes a slinger inner peripheral cylindrical portion 36c, constituting the second cylindrical portion 31, that is fitted onto the outer peripheral surface of the inner ring 3a of the inner ring member 3, a slinger disk portion 36a extending outward from an end portion of the slinger inner peripheral cylindrical portion 36c on the vehicle body side, and a slinger outer peripheral cylindrical portion 36b extending from the outer peripheral edge portion of the slinger disk portion 36a toward the back side of the sealed space 6 approximately parallel to the rotation axis L direction. The slinger outer peripheral cylindrical portion 366 is arranged such that the end surface on the back side of the sealed space 6 faces the core member disk portion 25b of the first member 20.

The annular magnet 38 includes an encoder body 38a that covers the vehicle body side surface of the slinger disk portion 36a, and a cover portion 38b, i.e., a facing surface 34 to be described later, formed to cover the outer peripheral surface of the slinger outer peripheral cylindrical portion 36b of the slinger 36. The disk portion 32 is constituted by the slinger disk portion 36a and the encoder body 38a.

As described above, the slinger 36 and the annular magnet 38 are integrated to form the second member 30 to be fitted to the outside of the inner ring member 3. Further, the intermediate cylindrical portion 33 is constituted by the slinger outer peripheral cylindrical portion 36b and the cove portion 38b. The end portion on the open side 33a of the intermediate cylindrical portion 33 faces inward of the sealed space 6.

Next explained is the positional relationship of the first member 20 and the second member 30 which are installed in the sealed space 6, specifically the shapes of the facing surfaces 22, 34 of the first cylindrical portion 21 and the intermediate cylindrical portion 33, and the gap space formed between the facing surfaces. This gap space is used as the above-mentioned communication path 40.

The surface of the seal cylindrical portion 27b, i.e., the facing surface 22, of the first cylindrical portion 21 is uneven or in concave and convex. Specifically, a plurality of protruding portions 22a, two protruding portions in the illustrated example, having approximately the same shape are formed side by side on the surface, and the protruding portions protrude at an angle so as to face the outside 13.

Further, the uneven surface of the facing surface 22 becomes away from the rotation axis L toward the outside 13, i.e., on the end portion on the open side 21a of the first cylindrical portion 21; that is, a top surface 22b of the protruding portion 22a and a concave bottom surface 22c partitioned by the protruding portion 22a have a larger distance from the rotation axis L toward the outside 13. Since the core member cylindrical portion 25a is formed parallel to the rotation axis L, the first cylindrical portion 21 constituted by the core member cylindrical portion 25a and the seal cylinder portion 27b becomes narrower toward the outside 13.

On the other hand, the surface of the cover portion 38b, i.e., the facing surface 34, of the intermediate cylindrical portion 33 is shaped like a staircase, and specifically has a shape in which a plurality of steps 34a, two steps in the illustrated example, are provided continuously. The surface of the step 34a is formed so as to gradually approach the rotation axis L toward the inner side of the sealed space 6, i.e., on the end portion on the open side 33a side of the intermediate cylindrical portion 33; that is, the step 34a is formed like a downward staircase toward the end portion on the open side 33a. Therefore, since the slinger outer peripheral cylindrical portion 36b is formed parallel to the rotation axis L, the intermediate cylindrical portion 33 is formed so as to be narrowed toward the end portion on the open side 33a.

The communication path 40 between the first cylindrical portion 21 and the intermediate cylindrical portion 33 has a repeatedly bent shape following the shapes of the facing surfaces 22, 34 on both sides. Further, the width dimension of the communication path 40 is not constant, and the protruding portion 22a of the first cylindrical portion 21 and the corner portion 34b of the step of the intermediate cylindrical portion 33 come close to each other to form the neck portion 41; while the concave bottom surface 22c of the first cylindrical portion 21 and the surface of the step 34a of the intermediate cylindrical portion 33 are separated from each other by a distance larger than the width dimension of the neck portion 41. Namely, the communication path 40 has a zigzag shape and is an irregular passage that widens and narrows repeatedly. At least one of the two neck portions 41 is the narrowest in the entire length of the communication path 40.

In the communication path 40, a passage formed on the outside 13 of the outermost protruding portion 22a preferably has a smaller width dimension than a passage formed between two adjacent protruding portions 22a, referring to the relationship of the width dimension W1<W2 in the figure. Further, in the example of FIG. 2, the passage formed further inward of the protruding portion 22a located inward of the sealed space 6 is larger than the passage formed between the two adjacent protruding portions 22a in the width dimension, referring to the relationship of the width dimensions W3>W2 in the figure. In other words, the communication path 40 is a passage having continuous wide and narrow widths due to the feature of the neck portion 41, but the passage excluding the neck portion 41 is formed in such a manner that the width dimension is narrow on the outside 13 and is wide on the inner side. However, the size relationship of the widths of the passages partitioned by the neck portions 41 of the communication path 40 is not limited to the one illustrated in the figures.

Modifications of the embodiments include, for example, the sealing devices 10A, 10B, 10C, 10D shown in FIG. 3A, FIG. 3B, FIG. 4A and FIG. 4B.

In the two examples of the sealing device 10A, 10B shown in FIG. 3A and FIG. 3B, a U-shaped slinger 36 is used like the one in FIG. 2. The sealing devices 10A, 10B are approximately the same as the one in FIG. 2 in the shape of the communication path 40, i.e., the numbers of the steps 34*a* and the protruding portions 22*a*, and the width dimension of the communication path 40; in the position in which the communication path 40 is formed; in the degree of inclination from the opening to the end portion on the open side 33*a* of the intermediate cylindrical portion 33.

The sealing device 10A of FIG. 3A is different from the one in FIG. 2 in that a part of the end portion on the open side 33*a* of the intermediate cylindrical portion 33 is not covered with the cover portion 38*b*, that is, a part of the step 34*a* of the facing surface 34 on the end portion on the open side 33*a* side is formed by a part of the surface of the externally exposed slinger outer peripheral cylindrical portion 36*b*. Further, the sealing device 10A of FIG. 3A is different from the one in FIG. 2 in that the lip portion 28 has a radial lip 28*a* and a side lip 28*b*.

The sealing device 10B of FIG. 3B is different from the one in FIG. 2 in that the annular magnet 38 is not used, only a part of the slinger disk portion 36*a* on the intermediate cylindrical portion 33 side is covered with an elastic body 38A made of an elastic member instead of the annular magnet 38, and most of the slinger disk portion 36*a* is exposed.

Figure 4A:
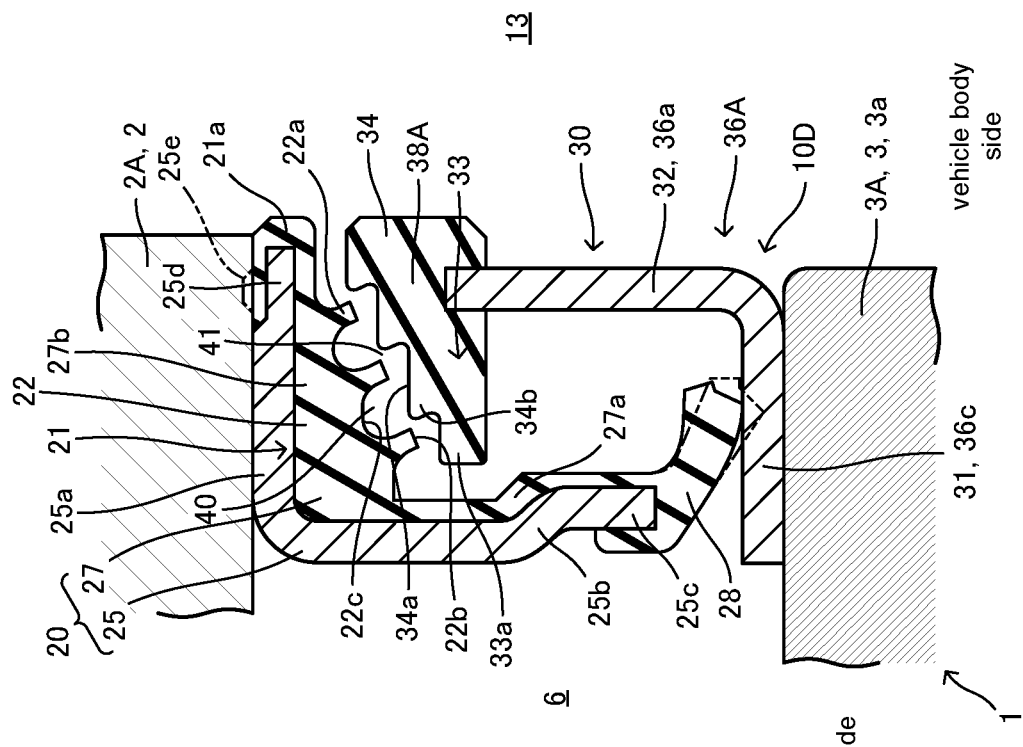
FIG. 4A and FIG. 4B are longitudinal sectional views showing two further examples of the sealing device.
Figure 4B:
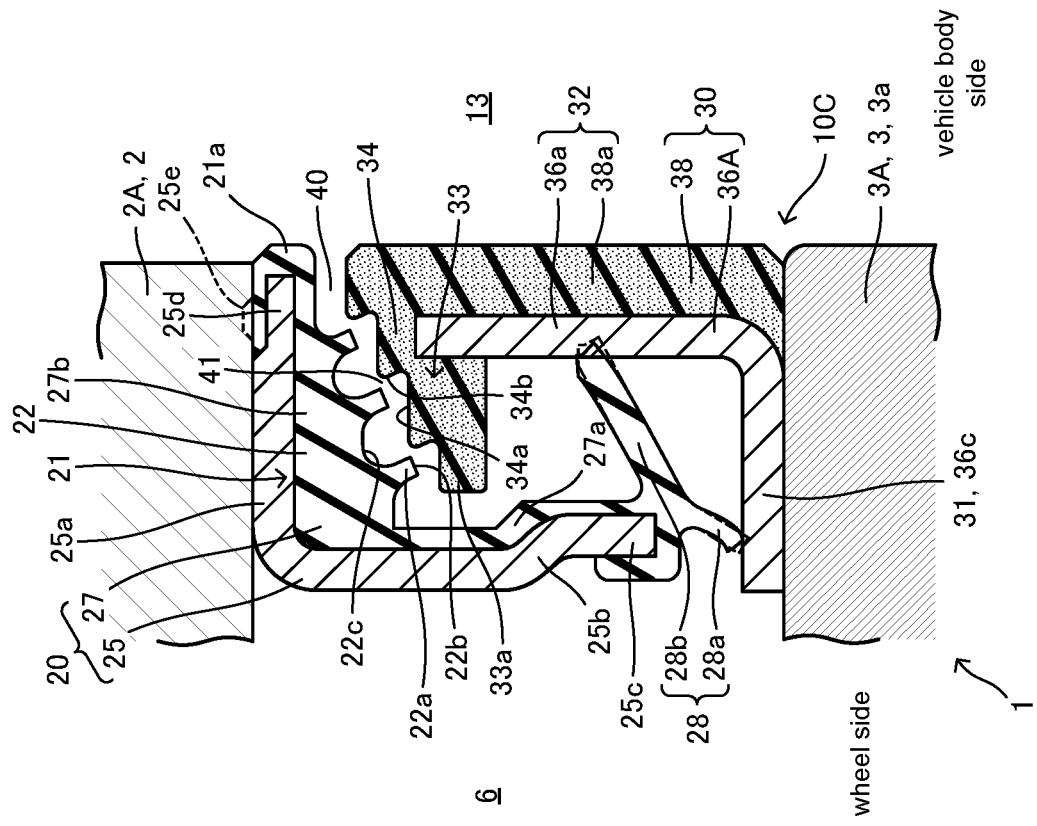
Figure 5:
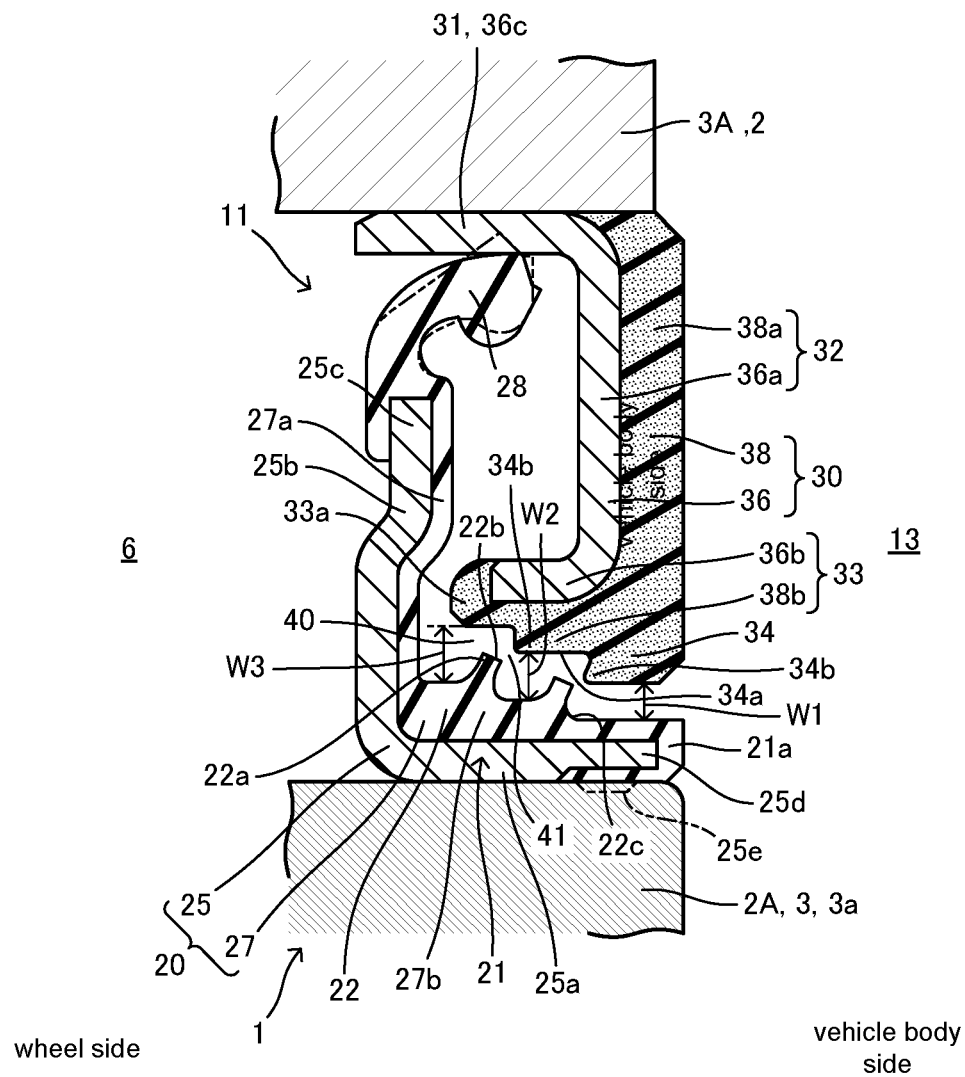
FIG. 5 is a longitudinal sectional view of a sealing device according to another embodiment of the present invention.

Furthermore, the two examples of sealing devices 10C, 10D shown in FIG. 4A and FIG. 4B are different from the one shown in FIG. 2 in that the numbers of the steps 34*a* and the protruding portions 22*a* which form the communication path 40 are respectively three. However, the sealing devices 10C, 10D are approximately same as the one in FIG. 2 in the shape of the communication path 40 (the number of the steps 34*a*, and the width dimension of the communication path 40), in the position in which the communication path 40 is formed, and in the degree of inclination from the opening to the end portion on the open side 33*a* of the intermediate cylindrical portion 33.

The sealing device 10C in FIG. 4A is different from the one in FIG. 2 in that an L-shaped slinger 36A is used and a part of the annular magnet 38 constitutes approximately the entire intermediate cylindrical portion 33. Further, the sealing device 10C is different from the one in FIG. 2 in that the lip portion 28 includes the radial lip 28*a* and the side lip 28*b*.

The sealing device 10D in FIG. 4B is different from the one in FIG. 2 in that the L-shaped slinger 36A is used, the elastic body 38A is used instead of the annular magnet 38, and the elastic body 38A constitutes approximately the entire intermediate cylindrical portion 33.

As described above, although the four examples shown in FIG. 3A, FIG. 3B, FIG. 4A and FIG. 4B are partially different from the sealing device 10 shown in FIG. 2, the shapes of the communication path 40 and the facing surfaces 22 and 34 are approximately the same as or similar to the one in FIG. 2.

According to the communication paths 40 of the sealing devices 10, 10A, 10B, 10C, 10D shown in FIG. 2 to FIG. 4, it is difficult for muddy water to enter from the outside 13 of the sealing devices 10, 10A, 10B, 10C, 10D, since the width dimension of the communication path 40 on the outside 13 is smaller than that of the inner side. In addition, since the communication path 40 has a bent shape, the intrusion speed of muddy water is lowered, and the amount of intrusion per unit time is reduced. In particular, the communication paths 40 in FIG. 4A and FIG. 4B have more protruding portions 22*a* and corner portions 34*b* than the one in FIG. 2, thereby further reducing the intrusion speed of muddy water.

Since the communication path 40 includes continuous wide and narrow regions by providing the neck portion 41 and becomes wider toward the inside, muddy water is suppressed from entering the space in the sealing device 10 at a rapid speed. Further, since the protruding portion 22*a* projects obliquely toward the outside 13, muddy water is easily prevented from entering through the communication path 40.

The various effects described above are combined and prevent the deterioration caused by the muddy water which enters the sealing devices 10, 10A, 10B, 10C, 10D, especially of the elastic members, i.e., the seal portion 27, the annular magnet 38, and the elastic body 38A, thereby elongating the service life of the sealing device.

Since the width dimension of the neck portion 41 of the communication path 40 becomes minute, there is a risk that the facing surfaces 22, 34 may come into contact with each other due to relative rotation of the outer ring member 2 and the inner ring member 3; however, since the width dimension of the protruding portion 22*a* is small, the stress caused by friction is reduced by deformation due to contact, and the adverse effects of rotation are reduced.

Since the first member 20 and the second member 30 are tapered toward the end portions on the open side 21*a*, 33*a* of the cylindrical portions, demolding ability at the time of manufacturing by molding is good, and the assembling ability of the both members is also good.

As in the examples shown in FIG. 2 to FIG. 4, one of the members constituting the facing surfaces 22, 34 on both sides of the communication path 40 is the seal portion 27, of which base material is an elastic material such as a synthetic resin material or a rubber material; the other of the above members is the annular magnet 38, of which base material is an elastic material such as a rubber material, so that conventional metal members such as the slinger 36 and the core member 25 are used without any design changes. Therefore, the sealing device 10 is manufactured easily and efficiently. When manufacturing the member by two-color molding, only a mold change is required.

In particular, the intermediate cylindrical portion 33 of the second member 30 is formed into a desired staircase shape by molding the annular magnet 38 and the elastic body 38A, regardless of the shape of the slingers 36, 36A such as a U-shaped or an L-shaped, referring to FIG. 2, FIG. 3A, FIG. 3B, FIG. 4A and FIG. 4B. Further, the thickness of the facing surface 34 is adjusted depending on the dimensions of the slinger disk portion 36*a*, thereby forming the intermediate cylindrical portion 33 for forming the communication path 40 with an appropriate path width, referring to FIG. 3A and FIG. 3B.

In the various examples shown above, the first member 20 is attached to the fixed member 2A, i.e., the outer ring member 2, and the second member 30 is attached to the rotary member 3A, i.e., the inner ring member 3; however, the first member 20 can be attached to the rotary member 3A, i.e., the inner ring member 3, and the second member 30 can be attached to the fixed member 2A, i.e., the outer ring member 2.

In the example shown above, the outer ring member 2 is the fixed member 2A and the inner ring member 3 is the rotary member 3A; however, the outer ring member 2 can be the rotary member 3A and the inner ring member 3 can be the fixed member 2A.

FIG. 5 shows one example of the sealing device 11 in which the first member 20 is attached to or fitted onto the inner ring member 3, which is the fixed member 2A, and the second member 30 is attached to or fitted into the outer ring member 2, which is the rotary member 3A. In FIG. 5, the same reference numerals are given to the portions common to those in FIG. 2, and the explanation thereof is omitted. The same applies to the width dimensions W1, W2, W3 in FIG. 5.

In the sealing device 11 of FIG. 5, the first member 20 is fitted to the fixed member 2A, i.e., the inner ring member 3, and the second member 30 is fitted to the rotary member 3A, i.e., the outer ring member 2. Although the first member 20, the second member 30, and the fitting relationship thereof are different from those in FIG. 2, FIG. 3, and FIG. 4, the communication path 40 formed by the first member 20 and the second member 30 and the facing surfaces 22, 34 on both sides of the communication path 40 have approximately the same relative positions as those in FIG. 2, FIG. 3, and FIG. 4 in view of the entire sealing device 11. It is because the cross-sectional view of the sealing device 11 shown in FIG. 5 has a mirroring relationship with the cross-section, not shown, of the sealing device 10 in the part Z in FIG. 2. Therefore, it goes without saying that the same effect as shown in FIG. 2 is achieved.

According to the communication path 40 of the sealing device 11 shown in FIG. 5, the width dimension on the outside 13 of the communication path 40 is smaller than that on the inner side, so that muddy water is difficult to enter from the outside 13 of the sealing device 11. Furthermore, since the communication path 40 has a bent shape, the intrusion speed of muddy water is lowered, and the amount of intrusion per unit time is also reduced.

Since the communication path 40 includes repeatedly widened and narrowed regions formed by the neck portion 41 and becomes wider toward the inside, muddy water is suppressed from entering the space in the sealing device 10 at a rapid speed. Further, since the protruding portion 22*a* projects obliquely toward the outside 13, muddy water is easily prevented from entering through the communication path 40.

The various effects described above are combined and prevent the deterioration by the muddy water which enters the sealing device 11, especially of the elastic members, i.e., the seal portion 27 and the annular magnet 38, thereby elongating the service life of the sealing device.

Since the width dimension of the neck portion 41 of the communication path 40 becomes minute, there is a risk that the facing surfaces 22, 34 may come into contact with each other due to relative rotation of the outer ring member 2 and the inner ring member 3; however, since the width dimension of the protruding portion 22*a* is small, the stress caused by friction is reduced by deformation due to contact, and the adverse effects of rotation are reduced.

In order to improve the effects, the conditions of the communication path 40 such that the opening side is narrow, wide and narrow regions are repeated, and there are many bent portions are combined to form the communication path 40 which prevents intrusion of muddy water.

Since the first member 20 and the second member 30 are tapered toward the end portions on the open side 21*a*, 33*a* of the cylindrical portions, demolding ability at the time of mold manufacturing is good, and the assembling ability of the both members is also good.

As in the example shown in FIG. 5, one of the members constituting the facing surfaces 22, 34 on both sides of the communication path 40 is the seal portion 27 of which base material is an elastic material such as a synthetic resin material or a rubber material; the other of the above members is the annular magnet 38 of which base material is an elastic material such as a rubber material, so that conventional metal members such as the slinger 36 and the core member 25 are used without any design changes. Therefore, the sealing device 10 is manufactured easily and efficiently. When manufacturing the member by two-color molding, it is only necessary to change a mold.

The examples shown in FIG. 2 to FIG. 5. are merely examples of the sealing devices 10, 10A, 10B, 10C, 10D, 11, and various shapes are acceptable. The number of protruding portions 22*a*, steps 34*a*, i.e., the corner portion 34*b*, can be other than the above. Further, the protruding portion 22*a* and the step 34*a*, i.e., the corner portion 34*b*, do not have to be a one-to-one correspondence. Furthermore, the wide and narrow portions of the communication path 40 can be of various types.

In the various examples described above, the protruding portion 22*a* is provided for the first cylindrical portion 21 and the step 34*a* is provided for the intermediate cylindrical portion 33; however, the step 34*a* can be provided for the first cylindrical portion 21 and the protruding portion 22*a* can be provided for the intermediate cylindrical portion 33.

The configurations and shapes of the sealing devices 10, 10A, 10B, 10C, 10D, 11 and the bearing device 1 according to the plurality of embodiments described above are merely examples. Needless to say, the configurations and the shapes can be appropriately changed from those shown in each example.

The reference examples of the present invention include sealing devices 100A, 100B shown in FIG. 6A and FIG. 6B. The sealing devices 100A, 100B are installed in the wheel side space in the sealed space 6, referring to the part Y in FIG. 1.

The sealing devices 100A, 100B include a third member 110 to be fitted and attached to the outer ring member 2, i.e., the fixed member 2A, and a fourth member 120 to be fitted and attached to the inner ring member 3, i.e., the rotary member 3A. The third member 110 includes a third cylindrical portion 111 to be fitted to the outer ring member 2; and the fourth member 120 includes a fourth cylindrical portion 121 to be fitted to the inner ring member 3, a fifth cylindrical portion 123 to be disposed on the outer side of the outer ring member 2, and a disk portion 122 connecting the fourth cylindrical portion 121 and the fifth cylindrical portion 123.

In the bearing device 1 to which the sealing devices 100A, 100B are mounted, the outer ring member 2 and the inner ring member 3 are in a relative rotational relationship, and it does not matter whether the outer ring member 2 is either the fixed member 2A or the rotary member 3A and whether the inner ring member 3 is either the rotary member 3A or the fixed member 2A.

Next, each of them is explained individually below. First, the sealing device 100A shown in FIG. 6A is described in detail.

The third member 110 includes a core member 115 to be fitted into the outer ring member 2 and a seal portion 117 made of an elastic member and fixed to the core member 115. More specifically, the core member 115 includes a core member cylindrical portion 115*a* to be fitted into the inner peripheral surface of the outer ring member 2, a core member disk portion 115*b* extending inward from an end portion of the core member cylindrical portion 115*a* on the back side of the sealed space 6, and a bent portion 115d to be bent from the wheel side end portion of the core member cylindrical portion 115a and abutted on the end surface of the outer ring member 2.

The seal portion 117 is an elastic member made of such as a rubber material or a synthetic resin material, and includes a seal base portion 117a integrally fixed to the core member 115 by vulcanization molding, a lip portion 118, i.e., a radial lip, extending inward from one end of the seal base portion 117a, and also includes an extension portion 117c extending from the other end of the seal base portion 117a so as to face the metal core cylindrical portion 115a with a predetermined space therebetween. In FIG. 6A, the two-dot chain line of the lip portion 118 indicates the original shape before elastic deformation.

The seal base portion 117a wraps around an inner peripheral edge portion 115c from the middle of the surface of the core member disk portion 115b on the back side of the sealed space 6, covers the entire surface of the opposite side, further covers the inner peripheral surface of the core member cylindrical portion 115a and the bent portion 115d, and is fixedly integrated with the core member 115.

The seal portion 117 includes a seal cylindrical portion 117b. The seal cylindrical portion 117b is constituted with a region covering the cylindrical core portion 115a and the bent portion 115d, which are a part of the seal base portion 117a, and the extension portion 117c extending from the end side of the bent portion 115d. The extension portion 117c extends approximately parallel to the core member cylindrical portion 115a so as to overlap with a predetermined space therebetween, and the seal cylindrical portion 117b as a whole is formed in a U-shape.

The seal cylindrical portion 117b is disposed in close contact with the outer peripheral surface of the outer ring member 2. That is, the third member 110 is attached such that the core member cylindrical portion 115a is fitted into the outer ring member 2 and the outer ring member 2 is held between the seal cylindrical portion 117b and the cored metal cylindrical portion 115a.

In this way, the third cylindrical portion 111 is constituted with the core member cylindrical portion 115a, the bent portion 115d continuously provided thereto, and the seal cylindrical portion 117b that covers them; and the outer surface of the extension portion 117c, i.e., a facing surface 112, that is a part of the seal cylindrical portion 117b, has an uneven shape, i.e., a concave and convex shape.

The fourth member 120 includes a double cylindrical slinger 126 with a horizontally inverted U-shaped cross-section that is fitted onto the inner ring member 3, and an elastic body 128A made of an elastic member fixed to the slinger 126.

The slinger 126 includes a slinger inner peripheral cylindrical portion 126c constituting the fourth cylindrical portion 121 to be fitted onto the outer peripheral surface of the inner ring member 3; a slinger disk portion 126a, constituting a disk portion 122a, that extends outward from the end portion on the wheel side of the slinger inner peripheral cylindrical portion 126c; and a slinger outer peripheral cylindrical portion 126b extending so as to be disposed on the outer peripheral side of the outer ring member 2 from the outer peripheral edge portion of the slinger disk portion 126a parallel to the rotation axis L direction.

In this way, the slinger outer peripheral cylindrical portion 126b of the slinger 126 and the elastic body 128A are integrated to form the fourth cylindrical portion 121 to be fitted to the outside of the inner ring member 3 by the slinger inner peripheral cylindrical portion 126c, and constitute the fifth cylindrical portion 123.

Next explained is the positional relationship of the third member 110 and the fourth member 120 which are installed in the sealed space 6, specifically the shapes of the facing surfaces 112, 124 of the third cylindrical portion 111 and the fifth cylindrical portion 123, and the gap space formed between the surfaces. This gap space serves as a communication path 130 that communicates the inner space of the sealing device 100A with the outer space 14 of the outer ring member 2.

The surface of the extending portion 117c, i.e., the facing surface 112, of the seal cylindrical portion 117b of the third cylindrical portion 111 has an uneven shape. Specifically, a plurality of protruding portions 112a, two protruding portions in the illustrated example, having approximately the same shape are formed on the surface and protrude obliquely so as to face the wheel side. In addition, the uneven surface approaches the rotation axis L as it goes toward the wheel side, (on the bent portion 115d side and the opposite side of the end portion on the open side 111a of the third cylindrical portion 111); that is, the distance from the top surface 112b of the protruding portion 112a to the rotation axis L and the distance from the bottom surface 112c partitioned by the protruding portion 112a to the rotation axis L are smaller toward the wheel side. Since the core member cylindrical portion 115a is formed approximately parallel to the rotation axis L, the third cylindrical portion 111 constituted with the core member cylindrical portion 115a and the seal cylindrical portion 117b is narrowed toward the wheel side.

On the other hand, the surface of the elastic body 128A, i.e., the facing surface 124, of the fifth cylindrical portion 123 is formed like a staircase, specifically, a plurality of steps 124a, two steps in the illustrated example, are provided continuously. The step 124a is formed so as to be apart from the rotation axis L toward the end portion on the open side 123a of the fifth cylindrical portion 123, that is, in the shape of a staircase going down toward the end portion on the open side 123a. Therefore, since the slinger outer peripheral cylindrical portion 126b is formed parallel to the rotation axis L, the fifth cylindrical portion 123 becomes narrower toward the vehicle body side, i.e., the end portion on the open side 123a.

The communication path 130 between the third cylindrical portion 111 and the fifth cylindrical portion 123 has a repeatedly bent shape that follows the surface shape of the facing surfaces 112, 124 on both sides thereof. The width dimension of the communication path 130 is not constant, and the protruding portion 112a of the third cylindrical portion 111 and the corner portion 124b of the staircase of the fifth cylindrical portion 123 are close to each other and form the neck portion 131; on the other hand, the concave bottom surface 112c of the third cylindrical portion 111 and the surface of the step 124a of the fifth cylindrical portion 123 are spaced apart from each other by a distance larger than the apart dimension of the neck portion 131. In this way, the communication path 130 has a zigzag shape and is an irregular passage that repeatedly widens and narrows. At least one of the two neck portions 131 is the narrowest in the entire length of the communication path 130.

In FIG. 6A, in the communication path 130, the passage formed on the outside of the protruding portion 112a located on the opening side of the communication path 130 is larger in the width dimension than the passage formed between the two adjacent protruding portions 112a; however, the size relationship of the width dimensions of the passage partitioned by the neck portion 131 of the communication path 130 is not limited to that shown in the figure. For example, in the communication path 130, the passage formed on the outer space 14 side of the protruding portion 112a located on the opening side of the communication path 130 can have a smaller width dimension than the passage formed between the two adjacent protruding portions 112a. Further, the passage formed further inward of the protruding portion 112a located on the inner side can have a larger width dimension than the passage formed between the two adjacent protruding portions 112a. In other words, the communication path 130 can have continuous wide and narrow portions formed by the neck portion 131, and the passage excluding the neck portion 131 can be formed to be narrow on the outer space 14 side and wide on the inner side.

According to such a communication path 130, since the communication path 130 has a bent shape and has continuous wide and narrow portions due to the feature of the neck portion 131, muddy water is prevented from entering the space in the sealing device 100A at a rapid speed. As a result, deterioration of the sealing device 100A is suppressed. Next, the sealing device 100B shown in FIG. 6B is described in detail.

The third member 110 includes a core member 115 to be fitted onto the outer ring member 2 and the seal portion 117 made of an elastic member and fixed to the core member 115. More specifically, the core member 115 includes the core member cylindrical portion 115a to be fitted onto the outer peripheral surface of the outer ring member 2, and the core member disk portion 115b, while being bent inward, extending from the wheel-side end portion of the core member cylindrical portion 115a.

The seal portion 117 is an elastic member made of such as a rubber material or a synthetic resin material, and includes the seal base portion 117a fixedly integrated with the core member 115 by vulcanization molding, the lip portion 118, i.e., the radial rip, extending inward from the seal base portion 117a, and also includes the seal cylindrical portion 117b fixedly integrated with the core member cylindrical portion 115a in a separate state from the lip portion 118. In FIG. 6B, the two-dot chain line of the lip portion 118 indicates the original shape before elastic deformation.

The seal base portion 117a wraps around the inner peripheral edge portion 115c from the middle of the core member disk portion 115b on the back side of the sealed space 6, and is fixedly integrated with the core member 115; and the lip portion 118 extends further than the inner peripheral portion 115c.

The fourth member 120 includes the double cylindrical slinger 126 that is fitted onto the inner ring member 3 and has a horizontally inverted U-shaped cross section, and an elastic body 128A fixed to the slinger 126.

The slinger 126 includes a slinger inner peripheral cylindrical portion 126c constituting the fourth cylindrical portion 121 to be fitted onto the outer peripheral surface of the inner ring member 3, the slinger disk portion 126a that constitutes the disk portion 122 and extends outward from the end portion on the wheel side of the slinger inner peripheral cylindrical portion 126c, and the slinger outer peripheral cylindrical portion 126b extending from the outer peripheral edge portion of the slinger disk portion 126a in parallel along the direction of the rotation axis L so as to be disposed on the outer peripheral side of the third cylindrical portion 111.

In this way, the slinger 126 and the elastic body 128A are integrated to form the fourth cylindrical portion 121 to be fitted to the outside of the inner ring member 3, and the slinger outer peripheral cylindrical portion 126b and the elastic body 128A form the fifth cylindrical portion 123.

Next explained is the positional relationship of the third member 110 and the fourth member 120 when they are installed in the sealed space 6, specifically the shapes of the facing surfaces 112, 124 of the third cylindrical portion 111 and the fifth cylindrical portion 123, and the gap space formed between both surfaces. The gap space serves as the communication path 130 communicating the inner space of the sealing device 100B with the outer space 14 of the outer ring member 2.

The surface of the seal cylindrical portion 117b, i.e., the facing surface 112, of the third cylindrical portion 111 has an uneven shape. Specifically, a plurality of protruding portions 112a, two protruding portions in the illustrated example, having approximately the same shape are formed on the surface and protrude obliquely toward the vehicle body. Further, the uneven surface approaches the rotation axis L toward the vehicle body side, i.e., the end portion on the open side 111a of the third cylindrical portion 111; that is, the distance from the top surface 112b of the protruding portion 112a to the rotation axis L and the distance from the bottom surface 112c partitioned by the protruding portion 112a to the rotation axis L are smaller toward the vehicle body side. Since the core member cylindrical portion 115a is formed approximately parallel to the rotation axis L, the third cylindrical portion 111 constituted with the core member cylindrical portion 115a and the seal cylindrical portion 117b is narrowed toward the vehicle body side, i.e., the end portion on the open side 111a side.

On the other hand, the surface of the elastic body 128A, i.e., the facing surface 124, of the fifth cylindrical portion 123 is formed like a staircase, specifically, a plurality of steps 124a, two steps in the illustrated example, are provided continuously.

The step 124a is formed so as to approach the axis toward the end portion on the open side 123a of the fifth cylindrical portion 123, namely in the shape of a staircase descending from the end portion on the open side 123a toward the wheel side. Therefore, since the slinger outer peripheral cylindrical portion 126b is formed parallel to the rotation axis L, the fifth cylindrical portion 123 is narrowed toward the wheel side, i.e., the side opposite to the end portion on the open side 123a.

The communication path 130 between the third cylindrical portion 111 and the fifth cylindrical portion 123 has a repeatedly bent shape that follows the surface shape of the facing surfaces 112, 124 on both sides thereof. Further, the width dimension of the communication path 130 is not constant, and the protruding portion 112a of the third cylindrical portion 111 and the corner portion 124b of the staircase of the fifth cylindrical portion 123 are close to each other and form the neck portion 131; while the concave bottom surface 112c of the third cylindrical portion 111 and the step 124a of the fifth cylindrical portion 123 are separated from each other by a distance larger than the width dimension of the neck portion 131. In this way, the communication path 130 has a zigzag shape and is an irregular path that repeatedly widens and narrows. At least one of the two neck portions 131 is the narrowest in the entire length of the communication path 130.

In the communication path 130, the passage formed on the outside of the protruding portion 112a located on the opening side of the communication path 130 can have a smaller width dimension than the passage formed between the two adjacent protruding portions 112a. The passage formed inside the protruding portion 112a on the inner side can have a larger width dimension than the passage formed between the two adjacent protruding portions 112a. That is, the communication path 130 is a continued wide and narrow passage formed by the neck portion 131, but the passage other than the neck portion 131 can be formed to be narrow on the outer space 14 side and wide on the inner side.

According to such a communication path 130, since the communication path 130 has a bent shape and has continued wide and narrow portions due to the neck portion 131, muddy water is prevented from entering the space inside the sealing device 100B at a rapid speed. As a result, deterioration of the sealing device 100B is suppressed.

DESCRIPTION OF REFERENCE NUMERAL 1 bearing member
2A fixed member
3A rotary member
2 outer ring member
3 inner ring member
6 sealed space
10, 10A, 10B, 10C, 10D, 11 sealing device
13 outside
14 outer space
20 first member
21 first cylindrical portion
21a open-side end portion
22 facing surface
22a protruding portion
22b top surface
22c concave bottom surface
25 core member
25a core member cylindrical portion
25b core member disk portion
25c inner peripheral edge portion
25d end portion on vehicle body side
25e projecting portion
27 seal portion, i.e., elastic member
27a seal base portion
27b seal cylindrical portion
28 lip portion
30 second member
31 second cylindrical portion
32 disk portion
33 intermediate cylindrical portion
33a open-side end portion
34 facing surface
34a step
34b corner portion
36,36A slinger
36a slinger disk portion
36b slinger outer peripheral cylindrical portion
36c slinger inner peripheral cylindrical portion
38 magnetic encoder, i.e., annular magnet, elastic member
38a encoder body
38b cover portion
38A elastic body, i.e., elastic member

What is claimed is:

1. A sealing device comprising a first member and a second member, one of the first member and the second member being fitted to a fixed member of a bearing device, an other of the first member and the second member being fitted to a rotary member of the bearing device, the sealing device being provided in a sealed space between the fixed member and the rotary member of the bearing device,
    wherein the first member comprises a first cylindrical portion to be fitted to the bearing device, and an end portion of the first cylindrical portion on an open side is arranged so as to face an outer side in the sealed space,
    wherein the second member comprises a second cylindrical portion to be fitted to the bearing device, a disk portion continuously provided at the second cylindrical portion, and an intermediate cylindrical portion continuously provided at the disk portion; and an end portion of the intermediate cylinder portion on an open side is arranged so as to face an inner side in the sealed space,
    wherein a communication path in a repeatedly bent shape communicating with the outer side is formed between the first cylindrical portion and the intermediate cylindrical portion when the sealing device is mounted in the sealed space, and
    wherein one of surfaces facing each other across the communication path is in a shape of a staircase in which steps are continuously provided so as to slope downward to the end portion of the intermediate cylindrical portion on an open side, and an other surface comprises a plurality of protruding portions protruding so as to approach the one of surfaces.

2. The sealing device according to claim 1, wherein each of the first cylindrical portion and the intermediate cylindrical portion includes a facing surface made of an elastic member.

3. The sealing device according to claim 1, wherein the communication path comprises a neck portion in which a space between the protruding portion and a corner portion of the staircase is narrowed.

4. The sealing device according to claim 3, wherein each of the first cylindrical portion and the intermediate cylindrical portion includes a facing surface made of an elastic member.

5. The sealing device according to claim 1, wherein in the communication path, a passage formed on the outer side of the protruding portion on an outermost side is smaller in width dimension than the passage formed between adjacent protruding portions.

6. The sealing device according to claim 5, wherein each of the first cylindrical portion and the intermediate cylindrical portion includes a facing surface made of an elastic member.

7. The sealing device according to claim 1, wherein the protruding portion slants and protrudes so as to face the outer side.

8. The sealing device according to claim 7, wherein each of the first cylindrical portion and the intermediate cylindrical portion includes a facing surface made of an elastic member.

* * * * *